March 6, 1962 W. M. DICKSON, JR., ETAL 3,023,739
HIGH SPEED PNEUMATIC ACTUATOR
Filed May 2, 1960
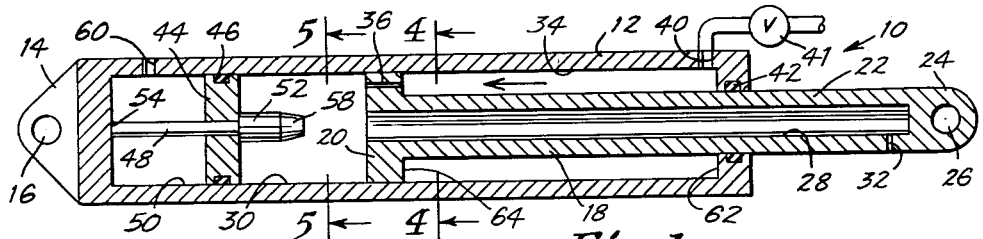
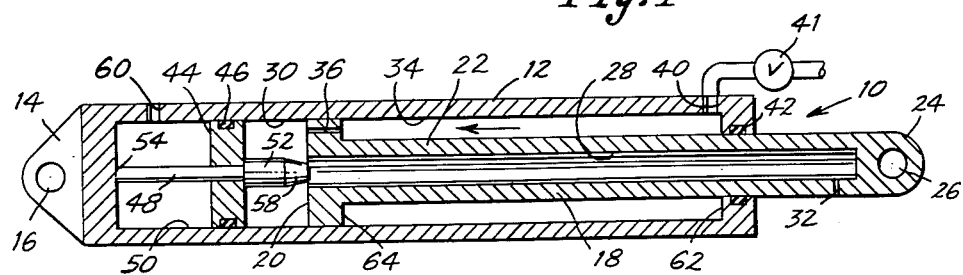
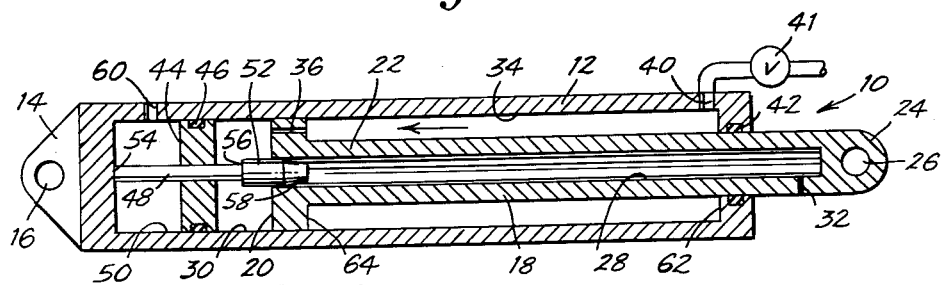
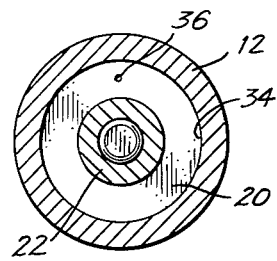
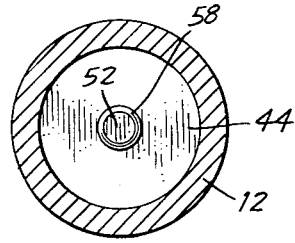
INVENTORS
William M. Dickson, Jr.
& Matthew N. Miller,
BY Diggins + LeBlanc
ATTORNEYS United States Patent Office 3,023,739
Patented Mar. 6, 1962

3,023,739
HIGH SPEED PNEUMATIC ACTUATOR
William M. Dickson, Jr., Torrance, and Matthew Ned Miller, Topanga, Calif., assignors to Fairchild Engine & Airplane Corp., Hagerstown, Md., a corporation of Maryland
Filed May 2, 1960, Ser. No. 26,015
18 Claims. (Cl. 121—38)

This invention relates to high speed pneumatic actuators and particularly to an actuator employing improved damping means along with an automatic high speed return stroke to the ready position.

High speed pneumatic actuators are well known and are used for a wide variety of functions such as for opening and closing valves, as catapults, ejectors and similar devices. However, a serious disadvantage of known high speed actuators is the abruptness with which the piston or other moving element of the actuator is brought to a halt at the end of the actuator stroke. The high speed necessarily employed creates excessive stresses in the materials of the actuator caused by the rapid deceleration forces generated at the end of the actuator stroke.

The present invention avoids the above mentioned difficulties by employing a novel double pneumatic cushion arrangement providing a rapid and yet highly resilient damping to a traveling pneumatic piston forming the moving element of the actuator. An important feature of the novel damping means of the present invention is the fact that it readily adapts itself to a wide range of operating pressures and fluids used to actuate the traveling piston. Additional important features of the present invention include a novel arrangement for automatically returning the piston to its ready position when the original stroke is completed, such return being accomplished without any additional apparatus and in a rapid and efficient manner.

It is therefore a primary object of the present invention to provide a novel high speed pneumatic actuator;

Another object of the present invention is to provide a high speed pneumatic actuator incorporating novel moving element damping means;

Another object of the present invention is to provide a piston type pneumatic actuator having a double cushion pneumatic damping construction readily adaptable to a wide range of fluids and operating pressures;

Another object of the present invention is to provide a pneumatic actuator having automatic piston return means to rapidly and efficiently return the piston to its ready position.

These and other objects and advantages of the invention will be more apparent upon reference to the following specification, claims and appended drawings wherein:

FIGURE 1 illustrates the novel actuator of the present invention approximately mid-way of its working stroke with the piston moving from right to left as indicated by the arrow in the drawings;

FIGURE 2 illustrates the actuator of FIGURE 1 nearing the end of its working stroke;

FIGURE 3 illustrates the actuator of FIGURES 1 and 2 at the end of its working stroke;

FIGURE 4 is a cross-section taken along line 4—4 of FIGURE 1; and

FIGURE 5 is a cross-section taken along line 5—5 of FIGURE 1.

Referring to the drawings, FIGURE 1 shows the novel actuator of the present invention generally indicated at 10 comprising a cylindrical housing 12 having a bracket 14 at one end provided with an aperture 16 for attachment to a suitable base or other support. Received within the cylinder 12 is a hollow piston 18 including a piston head 20 and piston rod 22. The right-hand end of rod 22 terminates in a bracket type portion 24 having an aperture 26 for connection to suitable apparatus to be energized such as a valve to be opened or a catapult type apparatus for ejecting flares. The piston and piston rod are provided with a unitary central tubular channel 28 opening at the head end of the piston into the chamber 30 formed within the cylindrical housing 12. The opposite end of channel 28 is connected to ambient air by means of an extremely small air bleed orifice 32.

On the opposite side of the head 20 from chamber 30 is a second chamber 34 communicating with the chamber 30 through a small piston return orifice 36 passing completely through the head 20 as best seen in FIGURES 1 and 4. Communicating with chamber 34 at the right hand end of cylinder 12 is a fluid inlet port 40 which connects the cylinder to a suitable fluid supply through valve 41.

As is apparent from the drawings, piston 18 is adapted to reciprocate within the cylinder 12 and is sealed from ambient air by means of a suitable sealing gasket 42. The head 20 in its normal rest position is spaced slightly from the right-hand end of chamber 12 and tends to move to the left in the direction of the arrow in FIGURE 1 during its working stroke. FIGURE 1 shows the piston as having travelled somewhat more than half-way through its working stroke.

Also slidably received within cylinder 12 is a damping piston 44 carrying sealing gasket 46. Damping piston 44 is slidable over a cylindrical arm 48 passing through a third chamber 50 within the cylinder 12 and terminating in a plug 52 extending into chamber 30 on the opposite side of damping piston 44. One end of arm 48 is supported in the end of cylinder 12 as indicated at 54. Damping piston 44 normally rests against the flat annular face 56 best seen in FIGURE 3 formed by the junction of plug 52 with arm 48. The plug is tapered at its outer end as indicated at 58 for reception within channel 28 in cylinder 18. Chamber 50 is provided with a fluid inlet orifice or fitting 60.

As mentioned above, the normal or rest position of the piston is with head 20 spaced slightly from end wall 62 of the cylinder so that inlet fluid supplied through inlet port 40 may gain access to the back face 64 of the piston head. By opening valve 41 and applying high pressure air or other suitable fluid to chamber 34 through inlet port 40, the hollow piston 18 is caused to move rapidly along the cylinder in the direction of the arrow in FIGURES 1 through 3. During this working stroke, some of the high pressure air bleeds through orifice 36 in the piston head into the chamber 30.

As the piston nears the end of the stroke in the position shown in FIGURE 2, the plug 52 enters the channel 28 in the hollow piston 18 and traps air in chamber 30 between the damping piston 44 and the piston head 20. Further movement of the hollow or main piston 18 into its extreme end of stroke position shown in FIGURE 3 compresses the air in chamber 30 and also the air or other suitable high pressure fluid in chamber 50 on the opposite side of damping piston 44. Chamber 50 is maintained at high pressure by supplying this chamber through port 60 with high pressure air or other suitable high pressure fluid. Hence, the double compression in both chamber 30 and in the high pressure chamber 50 act to dampen and resiliently and yet rapidly halt the leftward movement of the piston 18.

When the piston reaches the end of its stroke as illustrated in FIGURE 3, air continues to bleed through orifice 36 tending to maintain balance of pressure on both sides of the piston head 20, that is, tending to equalize the pressure in chambers 30 and 34. However, since the net effective area of piston head 20 facing chamber 30 is greater than the area of rear surface 64, the piston is driven to the right in a direction opposite to the arrows shown in FIGURES 1 through 3 and back to its rest position at the right-hand end of cylinder 12.

Upon the piston's reaching its normal rest position in the right-hand end of the piston chamber inlet port 40 is decoupled from the fluid source by closing valve 41 in the fluid supply line. As soon as the actuator is sufficiently purged by leakage through bleed 32 the system is ready for a new cycle and is again actuated by opening of valve 41 to admit high pressure gas to the piston.

Valve 41 may be shut at any desired time. Residual pressure in chamber 34 is sufficient to return the piston. In this manner, considerable economy of air is achieved since no more than firing air is required to complete a full cycle.

It is apparent from the above that the present invention provides a novel high speed actuator incorporating means for rapidly and yet resiliently damping the movement of the main actuator piston. By means of the simple construction shown the relatively large deceleration forces with the attendant wear and deformation of material is substantially eliminated. Furthermore the pneumatic damping arrangement employed makes it possible to adapt the system to relatively wide variations in operating pressures and provides for the automatic adaptation of the system to different pressure fluids. Important features of the present invention include the automatic arrangement for rapidly returning the piston to its normal rest position by means of the driving fluid. The device is of relatively simple and inexpensive construction and completely reliable in operation.

The invention may be embodied in other specific forms without departing from the spirit or essential characteristics thereof. The present embodiment is therefore to be considered in all respects as illustrative and not restrictive, the scope of the invention being indicated by the appended claims rather than by the foregoing description, and all changes which come within the meaning and range of equivalency of the claims are therefore intended to be embraced therein.

What is claimed and desired to be secured by United States Letters Patent is:

1. A high speed actuator comprising a housing, a main piston slidably received in said housing, means for applying a high pressure fluid to one side of said piston, a damping piston slidably received in said housing between said main piston and one wall of said housing, and means responsive to movement of said main piston for sealing off the space between said main piston and said damping piston.

2. A high speed actuator comprising a piston cylinder, a main piston slidably received for reciprocation within said cylinder, means for applying a high pressure fluid to one side of said piston to drive it along said cylinder, a damping piston slidably received in said cylinder between an end wall and the other side of said main piston, and means responsive to movement of said main piston as it approaches said damping piston for sealing off the space between said two pistons.

3. A high speed actuator according to claim 2 wherein the space between said damping piston and said end wall of said cylinder is filled with a compressible substance.

4. A high speed actuator according to claim 3 wherein said compressible substance is a sealed fluid.

5. A high speed actuator according to claim 4 wherein said sealed fluid is air.

6. A high speed actuator according to claim 4 wherein said sealed fluid is compressed air.

7. A high speed actuator comprising a piston cylinder, a main piston slidably received for reciprocation within said cylinder, means for applying a high pressure fluid to one side of said piston to drive it along said cylinder, a damping piston slidably received in said cylinder between an end wall and the other side of said main piston, said main piston having a hollow interior communicating with said cylinder, and means responsive to movement of said main piston as it approaches said damping piston for closing off communication between said cylinder and the interior of said main piston.

8. A high speed actuator according to claim 7 wherein said hollow interior has a mouth opening into said cylinder and said movement responsive means comprises a plug closing off said mouth.

9. A high speed actuator according to claim 8 wherein said main piston slides over said plug to close off its hollow interior to said cylinder.

10. A high speed actuator according to claim 9 wherein said plug is supported on an arm projecting from the end of said cylinder toward which said main piston is driven by said high pressure fluid.

11. A high speed actuator according to claim 10 wherein said damping piston is slidable on said arm.

12. A high speed actuator according to claim 11 wherein said damping piston is spaced from said end wall by a sealed resilient fluid.

13. A high speed actuator comprising a piston cylinder, a main piston having a hollow interior slidably received for reciprocation within said cylinder, inlet means for applying a high pressure fluid to one side of said piston to drive it along said cylinder, said piston interior having a mouth on the leading face of said piston opening into said cylinder, an arm extending into said cylinder from the end toward which said main piston is driven, said arm terminating in a plug of increased cross section slidably receivable in said mouth for sealing off the interior of said main piston from said cylinder; a damping piston slidably received on said arm, and resilient means biasing said damping piston against said plug.

14. A high speed actuator according to claim 13 wherein said resilient means is a sealed fluid.

15. A high speed actuator according to claim 13 wherein said resilient means is compressed air.

16. A high speed actuator according to claim 14 wherein both of said fluids are air and said main piston is provided with a piston return orifice for equalizing the pressures on opposite sides of said main piston after completion of its work stroke.

17. A high speed actuator according to claim 16 including a slow bleed orifice from the interior of said main piston for purging said actuator.

18. A high speed actuator according to claim 17 wherein said leading face of said piston has a substantially greater area than the other face thereof whereby residual gas in said cylinder returns said piston to its start of cycle position.

References Cited in the file of this patent

UNITED STATES PATENTS

| 396,108 | Nickerson | Jan. 15, 1889 |
| 1,685,750 | Pfau et al. | Sept. 25, 1928 |
| 2,156,005 | Williams | Apr. 25, 1939 |
| 2,642,848 | Walraven et al. | June 23, 1953 |
| 2,715,389 | Johnson | Aug. 16, 1955 |